United States Patent [19]

Bala

[11] Patent Number: 4,823,949

[45] Date of Patent: Apr. 25, 1989

[54] SHEATH FOR PROBE WITH IMPROVED SEAL ARRANGEMENT

[76] Inventor: Harry Bala, 2024 Williamsburg Dr., Streamwood, Ill. 60107

[21] Appl. No.: 205,316

[22] Filed: Jun. 10, 1988

Related U.S. Application Data

[63] Continuation of Ser. No. 41,935, Apr. 24, 1987, abandoned.

[51] Int. Cl.$^4$ ............................................. B65D 85/38
[52] U.S. Cl. .................................... 206/306; 206/212; 374/158
[58] Field of Search ................... 206/212, 306, 363; 374/158

[56] References Cited

U.S. PATENT DOCUMENTS

| | | | |
|---|---|---|---|
| 3,092,252 | 6/1963 | Brause et al. | |
| 3,215,265 | 11/1965 | Welin-Berger | 206/212 X |
| 3,552,558 | 1/1971 | Poncy | 206/306 |
| 3,732,975 | 5/1973 | Poncy. | |
| 3,752,309 | 8/1973 | Hopkins et al. | 206/306 |
| 3,809,228 | 5/1974 | Fowler et al. | 206/306 |
| 3,809,230 | 5/1974 | Poncy | 206/306 |
| 3,847,280 | 11/1974 | Poncy. | |
| 3,850,084 | 11/1974 | Fowler et al. | 206/306 X |
| 4,026,751 | 5/1977 | Fowler et al. | 206/306 X |
| 4,062,239 | 12/1977 | Fowler et al. | 206/306 X |
| 4,136,776 | 1/1979 | Poncy. | |
| 4,165,000 | 8/1979 | Poncy | 206/306 |
| 4,614,442 | 9/1986 | Poncy | 374/158 |

*Primary Examiner*—Stephen Marcus
*Assistant Examiner*—Bryon Gehman
*Attorney, Agent, or Firm*—Gerstman & Ellis, Ltd.

[57] ABSTRACT

A packaged sheath for a probe such as a medical thermometer or the like comprises a backing web, and a flattened probe sheath having an open end and a closed end. The sheath defines a pair of connected, flat sides, with a portion of one flat side of the sheath being sealed adjacent its open end to the backing web. A tab member is sealed in an area to the other flat side of the sheath adjacent its open end. An upper web is peripherally sealed to the backing web at side areas. A preferred design of packaged sheath in accordance with this invention can be opened in a variety of different ways, to conform to varying, customary procedures to which the user has been previously trained.

6 Claims, 1 Drawing Sheet

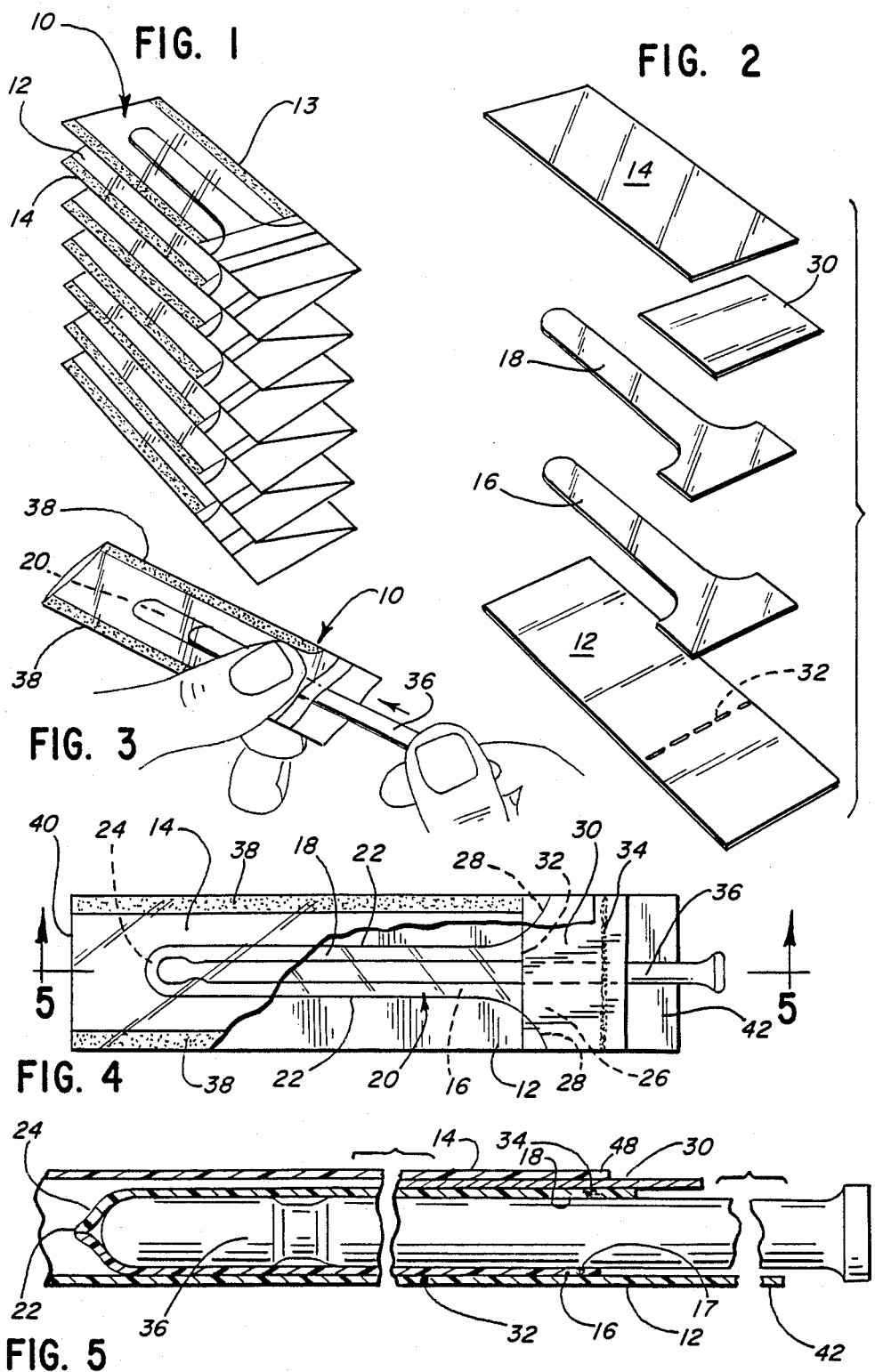

SHEATH FOR PROBE WITH IMPROVED SEAL ARRANGEMENT

This application is a continuation of Ser. No. 07/041,935 filed Apr. 24, 1987, now abandoned.

BACKGROUND OF THE INVENTION

It is a growing custom in hospitals, clinics, and the like to provide a disposable sheath to mouth and rectal thermometers that are used with patients. Typically, the thermometer itself is sterilized between uses, but such a disposable sheath provides added protection against the possible spread of disease between the patients by its use.

Various designs of packaged thermometer sheaths are currently commercially available to hospitals and clinics, with each sheath coming in a little flat package, often in strips of packaged sheaths with connecting backings which may be torn apart at perforations.

Some designs of packaged sheaths, for example the SaniTherm sheath, carries a flattened probe sheath between a backing web and an upper web, which webs are peripherally sealed together at side areas. The package is opened by grasping a pair of plastic tabs, each of which is sealed to an opposed side of the open end of the flattened probe sheath, and then pulling away the sheath from the package.

As one disadvantage of this structure, difficulties are encountered in inserting the thermometer into the sheath if one is not careful to properly grasp the tab members. The sheath can otherwise collapse, as one attempts to insert the thermometer, resulting in a waste of time, and sometimes requiring the nurse to get a new packaged sheath and to try again.

On the other hand, the Steritemp packaged sheath manufactured by the Steridyne Corporation requires a rather complex method of opening. First, the thermometer must be inserted into the sheath. Then, one peels back one of the backing sheaths, peeling the other backing sheath, and snapping off an end portion defining the "funnel" of the sheath. Extra flashing portions of surplus plastic material from which the sheath was formed by heat sealing adhere to the backing layers of the sheath package.

In the B-D Temp-Away thermometer sheath, manufactured by Becton Dickinson Company, the packaged sheath is opened by twisting a perforated end portion of the sealed backing webs after insertion of a thermometer between those end portions to enter the sheath. With such twisting, the end portion separates along perforations, and it and the sheath may slide out of the remainder of the peripherally sealed backing webs.

This latter design of packaged sheath is not practically openable by peeling away backing webs, but rather only by the insertion of the thermometer and twisting of the end portion.

In hospitals and clinics, nurses and other practioners who make use of packaged thermometer sheaths become accustomed to opening the sheath in a certain prescribed way, either by twisting the end or by peeling a backing sheet away, depending upon the particular brand of packaged sheath that they customarily use. It has been found that a significant sales resistance can arise among such people to new products which are openable in a way different to that to which they have become accustomed, since the users find it aggravating and time consuming to change their routine in handling packaged sheaths for thermometers and the like.

By this invention, a packaged sheath for a probe is provided which may be opened in more than one way, so that it becomes easily usable by nurses or others who have been trained to open the packaged sheaths by twisting off the end, and also by those who have been trained to use a peel-away or pull-away opening technique. This provides a significant improvement in versatility of the product of this invention.

Additionally, the product of this invention is of efficient, economical construction, since it eliminates a piece part, when compared with the prior art Sani-Therm packaged sheath, for a reduction in manufacturing cost. At the same time, the packaged sheath of this invention provides easier insertion of a thermometer or other probe into the sheath, when compared with prior art structures, so that less practice is needed for effective use of the product by untrained people.

DESCRIPTION OF THE INVENTION

In accordance with this invention, a packaged sheath for a probe is provided, which comprises a backing web, and a flattened probe sheath having an open end and a closed end, said sheath defining a pair of connected, flat sides which are typically plastic sheets which have been heat sealed together. A portion of one flat side of the sheath is sealed adjacent its open end to the backing web. A tab member is sealed in an area to the other flat side of the sheath adjacent its open end. An upper web is peripherally sealed to the backing web at side areas.

The packaged sheath of this invention may have upper and backing webs which are separable by manual tearing apart for access to the probe sheath. It is also preferable for the backing web to define a transverse line of tearing weakness which is positioned more remotely from the open end than the sealed area of the sheath to the backing web. As the result of this, the tab member, the probe sheath, and an end portion of the backing web may be separated from the remainder of the backing web by breaking the transverse line, with the tab member and end portion of the backing web serving as a handle for the probe sheath. When both of the features described above are present, the packaged sheath of this invention is capable of being opened by twisting off its end in a manner similar to some prior art constructions, and also by peeling away or pulling away of the outer webs in a manner similar to other available designs of packaged sheaths.

Generally, at least a section, and typically most of the probe sheath which is more remote from the open end than the portion described above of the one flat side of the sheath, is releasably adhered to the backing web, for example with a tack seal, so that the probe sheath remains lightly retained in flat relation on the backing web until peeled or pulled away. On the other hand, the upper web is typically substantially free of adhesion to the probe sheath, to facilitate easy peeling removal of the upper web when that opening method is used, and also facilitating withdrawal of the probe sheath after twisting off the end of the package, when that method is used.

Additionally, funnel means comprising outwardly flaring seal lines adjacent the open end of the probe sheath may be defined therein, which seal lines connect the flat sides of the probe sheath together. The funnel means serves as a guide and directing means to assist in insertion of a probe such as a medical thermometer, for ease of insertion of the probe into the probe sheath.

The packaged sheath of this invention may be made of paper and plastic materials similar to those used in corresponding structures of the prior art. Similarly, the same techniques and apparatus for manufacturing may be used in the packaged sheaths of this invention as in the prior art. While medical thermometers are specifically contemplated as the probes for use with this invention, any other kind of probe may also be used.

DESCRIPTION OF DRAWINGS

In the drawings,

FIG. 1 is a perspective view of a series of packaged sheaths in accordance with this invention, connected together on a common backing web that folds along lines of tearing weakness.

FIG. 2 is an exploded perspective view of parts of the packaged sheath of this invention.

FIG. 3 is a perspective view of the packaged sheath of FIG. 2 shown in the process of thermometer insertion.

FIG. 4 is a plan view of the packaged sheath of this invention with portions broken away, showing an inserted thermometer in the probe sheath.

FIG. 5 is a sectional view taken along line 5—5 of FIG. 4, on an enlarged scale and with certain portions broken away.

DESCRIPTION OF SPECIFIC EMBODIMENT

Referring to the drawings, FIG. 1 shows a folded stack of packaged sheaths 10 in accordance with this invention. Packaged sheaths 10 in the stack share a common backing web 12, with the separate sections of backing web 12 associated with each packaged sheath being separated by fold lines 13, which are generally perforated so that the individual packaged sheaths 10 may be separated from the adjacent sheaths by tearing.

Referring to FIG. 2, the separate parts of packaged sheath 10 are disclosed. Backing web 12 defines the bottom layer of the assembly, while upper web 14 defines the top layer. In between these layers are a pair of flat side sections 16, 18 of probe sheath 20. In actuality, sections 16, 18 are typically not ever found in separate form, but are formed by the sealing together of plastic sheet portions along heat seal line 22 (FIG. 4), followed by cutting away of the outer flashing material so that the sealed probe sheath may be provided without outer flashing portions, as is preferred. As shown, probe sheath 20 defines a closed end 24 and an open end 26, which is defined by the outwardly flaring portions 28 of seal line 22, holding together flat wall portions 16, 18.

The last part shown in FIG. 2 is tab member 30, which is made of a material which can be heat sealed to flat wall 18 of probe sheath 20.

Backing web 12 defines a transverse line of tearing weakness 32, typically perforations.

Tab member 30 is sealed to flat side 18 along a transverse area 34 to cause the tab member to be in adherent relation thereto. Additionally, the portion 28 of seal line 22 that defines the funnel portion may not only seal together flat sides 16 and 18, but it also may seal tab 30 to those two sides. This leaves open end 26, bracketed by the funnel shaped seal lines, between flat sides 16 and 18, providing a space for insertion of thermometer 36 as shown in FIG. 3 and also elsewhere. Side 16 of sheath 20 is sealed at transverse line 17 to backing web 12.

As shown particularly in FIGS. 3 and 4, upper web 14 and backing web 12 are peripherally sealed to each other at side areas 38. Typically, the nature of peripheral seal lines 38 is such that they may be easily peeled apart for opening, in the standard manner of a peel seal. End 40 of backing web 12 and upper web 14 may have a transverse seal therebetween if desired, but in the particular embodiment shown such a seal is not used so that webs 12 and 14 are open at their ends.

Most of flat side 16 may be adhered to backing web 12 with a light tack seal to keep sheath 20 in desired position, but permitting easy removal thereof. On the other hand, preferably, no such tack seal is provided between upper web 14 and flat side 18.

Accordingly, as shown in FIG. 3, one may insert thermometer 36 into sheath 20 so that it occupies the position shown in FIGS. 4 and 5. After thermometer 36 has been inserted, one may remove the outer packaging of packaged sheath 10 by grasping end portion 42 of backing web 12. One may then also grasp end 48 of upper web 14, which is typically not attached to tab 30, and peel it away toward end 40 to expose probe sheath 20. One then can easily lift thermometer 36 and probe sheath 20 away from backing web 12, severing perforations 32 in the process.

Alternatively, one may open the packaged sheath 10 of this invention, after insertion of thermometer 36, simply by grasping end 42 of the backing web and thermometer 36 and twisting it if necessary to break transverse perforation line 32. Thereafter, the thermometer and sheath 20 may be easily withdrawn out of the package defined by webs 12, 14 without rupturing seal lines 38. The tack seal between flat side 16 and backing web 12 is preferably weak enough to permit this.

Accordingly, a packaged sheath is provided which is easy to manufacture, with the elimination of a part as described above when compared with one predecessor design of the prior art. The packaged sheath may be opened in a manner that is similar to different opening techniques of various prior art packaged sheaths, for ease of use by various groups which have been trained with other, competing products.

Additionally, the insertion of thermometer 36 is facilitated when compared with prior art packaged sheaths.

The above has been offered for illustrative purposes only, and is not intended to limit the scope of the invention of this application, which is as defined in the claims below.

That which is claimed is:

1. A packaged sheath for a probe, which comprises:
a backing web;
a flattened probe sheath having an open end and a closed end, said sheath defining a pair of connected, flat sides, a portion of one flat side of said sheath being sealed adjacent its open end to said backing web;
a tab member sealed in an area to the other flat side of said sheath adjacent its open end; and
an upper web peripherally sealed to said backing web at side areas, said upper and backing webs being separable by manual tearing apart for access to said probe sheath, said probe sheath being permanently sealed only adjacent its open end to the backing web and said backing web defining a transverse line of tearing weakness positioned more remotely from said open end than the sealed area of said sheath and backing web, whereby said tab member, said probe sheath, and the end portion of the backing web may be separated from the remainder of the backing web by breaking said transverse line, said tab member being separate from said backing and upper webs, said tab member and end portion of the backing web serving as a handle for the probe sheath.

2. The packaged sheath of claim 1 in which at least a section of said probe sheath more remote from said open end than said portion of one flat side is releasably adhered to said backing web.

3. The packaged sheath of claim 1 in which said upper web is substantially free of adhesion to said probe sheath.

4. The packaged sheath of claim 1 in which funnel means comprising outwardly flairing seal lines connecting said flat sides together are defined adjacent said open end of the probe sheath.

5. A packaged sheath for a probe, which comprises:
a backing web;
a flattened probe sheath having an open end and a closed end, said sheath defining a pair of connected, flat sides, a portion of one flat side of said sheath being permanently sealed only adjacent said open end to said backing web;
a tab member sealed in an area to the other flat side of said sheath adjacent its open end; and
an upper web peripherally sealed to said backing web at side areas, at least a portion of said probe sheath which is more remote from said open end than said portion of one flat side being releasably adhered to said backing web, said upper web being substantially free of adhesion to said probe sheath, said backing web defining a transverse line of tearing weakness positioned more remotely from said open end than the sealed area of said sheath to the backing web, whereby said tab member, said probe sheath, and an end portion of the backing web may be separated from the remainder of the backing web by breaking said transverse line, said tab member being separate from said backing and upper webs, said tab member and end portion of the backing web serving as a handle for the probe sheath, said upper and backing webs being separable by manual tearing apart for access to the probe sheath.

6. The packaged sheath of claim 5 in which funnel means comprising outwardly flairing seal lines connecting said flat sides together are defined adjacent the open end of the probe sheath.

* * * * *